United States Patent
Kennedy

(10) Patent No.: US 7,460,566 B2
(45) Date of Patent: Dec. 2, 2008

(54) LASER POWER REDUCTION WITHOUT MODE CHANGE

(75) Inventor: Chandler James Kennedy, Town & Country, MO (US)

(73) Assignee: Northrop Grumman Corporation, Los Angeles, CA (US)

( * ) Notice: Subject to any disclaimer, the term of this patent is extended or adjusted under 35 U.S.C. 154(b) by 42 days.

(21) Appl. No.: 11/415,933

(22) Filed: May 2, 2006

(65) Prior Publication Data

US 2007/0258493 A1    Nov. 8, 2007

(51) Int. Cl.
    H01S 3/11    (2006.01)
(52) U.S. Cl. ............................... 372/10; 372/9; 372/12
(58) Field of Classification Search ............... 372/10, 372/9, 12
    See application file for complete search history.

(56) References Cited

U.S. PATENT DOCUMENTS

| | | |
|---|---|---|
| 3,631,362 A | 12/1971 | Almasi et al. |
| 3,633,126 A | 1/1972 | Martin et al. |
| 3,771,031 A | 11/1973 | Kay |
| 3,810,041 A | 5/1974 | Martin |
| 3,820,038 A | 6/1974 | Tomlinson |
| 3,986,130 A | 10/1976 | Soures et al. |
| 4,084,883 A | 4/1978 | Eastman et al. |
| 4,091,274 A | 5/1978 | Angelbeck et al. |
| 4,156,209 A | 5/1979 | Herbst et al. |
| 4,225,826 A | 9/1980 | Lewis et al. |
| 4,228,406 A | 10/1980 | Lewis et al. |
| 4,233,567 A | 11/1980 | Chernoch |
| 4,249,141 A | 2/1981 | Brown et al. |
| 4,468,774 A | 8/1984 | Robbins |
| 4,575,854 A | 3/1986 | Martin |
| 4,710,940 A | 12/1987 | Sipes, Jr. |
| 4,730,324 A | 3/1988 | Azad |
| 4,731,795 A | 3/1988 | Clark et al. |
| 4,741,354 A | 5/1988 | DeMild, Jr. |
| 4,876,694 A | 10/1989 | Hughes |
| 4,949,346 A | 8/1990 | Kuper et al. |
| 4,972,426 A | 11/1990 | Steffen |
| 5,084,888 A | 1/1992 | Tajima et al. |
| 5,084,889 A | 1/1992 | Tajima |
| 5,138,628 A | 8/1992 | Pocholle et al. |
| 5,148,445 A | 9/1992 | Liu et al. |
| 5,150,371 A | 9/1992 | Abramov et al. |
| 5,156,999 A | 10/1992 | Lee |
| 5,239,549 A | 8/1993 | Tajima et al. |

(Continued)

*Primary Examiner*—Minsun Harvey
*Assistant Examiner*—Yuanda Zhang
(74) *Attorney, Agent, or Firm*—Nixon Peabody LLP

(57) ABSTRACT

A laser system comprises a source, a laser medium, first and second mirrors, a Q-switch, and a control system. The source produces input energy. The laser medium converts the input energy to an output beam. The first and second mirrors are disposed on opposing sides of the laser medium. The output beam reflects between the first and second mirrors. The first mirror is an output mirror for releasing a pulsed laser beam having an energy level. The Q-switch is made of material that has an alterable optical property in response to a Q-switch input signal. The control system selectively varies the Q-switch input signal to control the energy level of the pulsed laser beam. A first Q-switch input signal produces a pulsed laser beam for a plurality of pulses at a maximum power level, while a second Q-switch input signal produces a pulsed laser beam at an intermediate power level.

20 Claims, 4 Drawing Sheets

U.S. PATENT DOCUMENTS

| | | | |
|---|---|---|---|
| 5,253,260 A | 10/1993 | Palombo | |
| 5,291,504 A | 3/1994 | Bournes | |
| 5,394,427 A | 2/1995 | McMinn et al. | |
| 5,434,875 A | 7/1995 | Rieger et al. | |
| 5,521,936 A | 5/1996 | Irwin | |
| 5,550,853 A | 8/1996 | Ostler | |
| 5,561,684 A | 10/1996 | Martin | |
| 5,563,899 A | 10/1996 | Meissner et al. | |
| 5,663,979 A | 9/1997 | Marshall | |
| 5,663,980 A | 9/1997 | Adachi | |
| 5,734,672 A | 3/1998 | McMinn et al. | |
| 5,832,013 A * | 11/1998 | Yessik et al. | 372/26 |
| 5,852,622 A | 12/1998 | Meissner et al. | |
| 5,898,211 A | 4/1999 | Marshall et al. | |
| 5,913,108 A | 6/1999 | Stephens et al. | |
| 5,936,984 A | 8/1999 | Meissner et al. | |
| 5,985,684 A | 11/1999 | Marshall et al. | |
| 6,014,393 A | 1/2000 | Fulbert et al. | |
| 6,026,109 A | 2/2000 | Micke et al. | |
| 6,038,240 A * | 3/2000 | Deutsch et al. | 372/25 |
| 6,061,378 A | 5/2000 | Marshall et al. | |
| 6,094,297 A | 7/2000 | Injeyan et al. | |
| 6,178,040 B1 | 1/2001 | Injeyan et al. | |
| 6,490,299 B1 * | 12/2002 | Raevsky et al. | 372/10 |
| 6,654,391 B2 * | 11/2003 | Adams | 372/10 |
| 6,744,803 B2 | 6/2004 | Kennedy | |
| 6,822,994 B2 | 11/2004 | Kennedy | |
| 2002/0110164 A1 | 8/2002 | Vetrovec | |
| 2002/0118718 A1 | 8/2002 | Honea et al. | |

* cited by examiner

| POWER, W | CURRENT, AMPS | PULSEWIDTH, ns | BEAM DIAM. X, mm | BEAM DIAM. Y, mm | POTENTIOMETER TURNS |
|---|---|---|---|---|---|
| 15 | 21.5 | 60 | .6625 | .7318 | 0 |
| 9 | 21.3 | 57 | .6127 | .6696 | 5 |
| 5 | 21.1 | 58 | .6265 | .6582 | 6 |
| 2 | 20.4 | 64 | .5906 | .5657 | 8 |

Fig. 5

| LASER OUTPUT POWER (W) | Q-SWITCH POWER DURING TRIGGER (W) | DRIVE CURRENT TO SOURCE (AMPS) |
|---|---|---|
| 15 | 0 | 22.0 |
| 12 | 10 | 21.9 |
| 9 | 15 | 21.8 |
| 6 | 18 | 21.5 |
| 3 | 20 | 21.0 |

Fig. 6

LASER POWER REDUCTION WITHOUT MODE CHANGE

FIELD OF THE INVENTION

The present invention relates generally to laser systems and, in particular, to a laser oscillator that uses a Q-switch component to modulate the output power of the laser oscillator.

BACKGROUND OF THE INVENTION

Solid-state laser systems are characterized in that they have a solid-state laser gain medium that converts energy from an optical pump source to a coherent output laser beam. The pump source can be one of many available energy-producing systems such as flash lamps or semiconductor laser diodes. The energy produced by the pump source is incident upon the laser medium and absorbed by the laser medium.

The absorbed energy in the laser medium causes the atoms in the laser medium to be excited and placed in a higher energy state. Once at this higher state, the laser medium releases its own energy, which is placed into an oscillating state by the use of a laser oscillator. The laser oscillator includes at least two reflective surfaces located on either side of the laser medium. The laser oscillator may be designed to continuously release a laser beam from the system. Alternatively, the oscillator can be designed such that when the energy oscillating through the laser medium reaches a predetermined level, it is released from the system as a high-power, short-duration laser beam.

In many systems, the laser medium is Neodymium-doped, Yttrium-Aluminum Garnet (Nd:YAG). A laser medium made from Nd:YAG absorbs optical energy most readily when the energy is at a wavelength of approximately 808 nm. Thus, the source to pump the Nd:YAG laser medium should be emitting light energy at approximately 808 nm. Gallium arsenide semiconductor laser diodes can be manufactured with dopants (e.g., aluminum) that will cause the emitted light to be in a variety of wavelengths, including 808 nm. Thus, the semiconductor laser diodes, which are lasers by themselves, act as the pump source for the laser medium.

Many laser systems emit energy in a pulsed mode. To accomplish this function, a laser system may include a Q-switch that is made of a material having alterable optical properties. The Q-switch is controlled between an "opened" state and a "closed" state by a radio frequency (RF) signal, which typically operates in the range of 37 MHz to 68 MHz. When the RF signal is applied, a loss is induced in a properly aligned optical beam which passes through the Q-switch by diffracting the light off an acoustic wave inside the Q-switch material, resulting in the "closed" state. Any energy that oscillates within a laser oscillator encounters the loss produced by the Q-switch, which, if it is larger than the gain through the laser medium, prevents it from building to appreciable levels. Hence, there is no laser output power from the system when the RF signal is applied to the Q-switch. When the RF input signal is removed from the Q-switch (i.e., the "opened" state), the gain in the system overcomes the residual loss of the laser oscillator and results in a pulse of energy being emitted from the laser system.

As an example, the Q-switch can cause the laser system to produce consistent pulses of energy at a range of repetition frequencies from 1 Hz to 50 kHz. This is accomplished by quickly switching between the "opened" state and the "closed" state at this frequency. However, at the very beginning of emitting a series of pulses at high repetition frequencies, the first few pulses may be extraordinarily intense, which may be deleterious to the application. To prevent this, the RF input signal during its "opened" state may initially decrease from its maximum power level (i.e., that of the "closed" state) to zero over the first few pulses. The effect this has on laser emission reduces the initial surge in power by forcing the laser oscillator to operate temporarily in a condition of high loss, even though this loss is less than the gain of the laser medium. This Q-switch driving technique is often referred to as "first pulse suppression".

The emitted energy produced from a solid-state laser system is generally coherent and exits the system in a predefined area. Thus, the optical power produced can be readily focused by the use of other optical components such as lenses. The resultant emitted energy can be used for a variety of industrial, medical, and scientific purposes such as cutting material, melting materials, ablating materials or vaporizing materials.

In typical systems, the traditional way to attenuate the output power from the laser oscillator is to turn down the drive current to the energy source (e.g., the laser diodes) that pump the laser medium. While the reduction in the pumping power does decrease the output power from the laser oscillator, the reduction also has undesirable effects on the output beam. In particular, the focal power of the laser medium changes, leading to a change in the fundamental mode size within the oscillator cavity. Ultimately, the output beam size, beam quality, and divergence are affected. Another way to attenuate the output power from the laser oscillator is to add additional components, such as a beam attenuator, which is located outside of the laser oscillator.

The present invention is directed to a laser system and method that solves the aforementioned problems. The output power is modulated in a manner that has only a minimal effect on the output beam size, beam quality, and divergence, without requiring additional components to be added to the laser system.

SUMMARY OF THE INVENTION

The present invention is directed to a laser system comprising a source, a laser medium, first and second mirrors, a Q-switch, and a control system. The source produces input energy in response to an input drive signal. The laser medium receives the input energy and converts the input energy to an output beam. The first and second mirrors are disposed on opposing sides of the laser medium. The output beam reflects between the first and second mirrors. The first mirror is an output mirror for releasing a pulsed laser beam having an energy level. The Q-switch is located between the first and second mirrors and in a path of the output beam. The Q-switch is made of material that has an optical property that is alterable in response to a Q-switch input signal. The control system controls the Q-switch input signal and the input-drive signal. The control system decreases the energy level of the pulsed laser beam by increasing the Q-switch input signal.

Alternatively, the present invention is a laser system comprising a source, a laser medium, first and second reflective surfaces, a Q-switch, and a control system. The source produces input energy and the laser medium receives the input energy and converts the input energy to an output beam. The first and second reflective surfaces are disposed on opposing sides of the laser medium. The output beam reflects between the first and second reflective surfaces. The first reflective surface releases a pulsed laser beam having an energy level. The Q-switch is located between the first and second reflective surfaces and in a path of the output beam. The Q-switch is made of material that has an optical property that is alterable in response to a Q-switch input signal. The control system selectively varies the Q-switch input signal to control the energy level of the pulsed laser beam. For example, a first Q-switch input signal produces a pulsed laser beam for a plurality of pulses at a maximum power level, while a second Q-switch input signal produces a pulsed laser beam for a plurality of pulses at an intermediate power level that is less than the maximum power level.

The present invention also includes methods of operating a laser system in which the output power of the laser system is selectively varied by changing the input drive signal to an optical component, such as a Q-switch. The laser system includes a source that produces input energy and a laser medium that receives the input energy. The laser medium converts the input energy to an output beam that reflects between first and second reflective surfaces. The method comprises, in response to a first control signal to an optical component made of a material having an alterable optical property and located between the first and second reflective surfaces mirrors, producing the pulsed laser beam for a plurality of pulses at a maximum power level. The method further includes, in response to a second control signal to the optical component, producing the pulsed laser beam for a plurality of pulses at an intermediate power level that is less than the maximum power level.

The above summary of the present invention is not intended to represent each embodiment or every aspect of the present invention. The detailed description and Figures will describe many of the embodiments and aspects of the present invention.

BRIEF DESCRIPTION OF THE DRAWINGS

FIG. 5 is a table illustrating the results of the laser system in which the Q-switch input signal is varied. and FIG. 6 schematically illustrates one example of a look-up table stored in a memory device associated with the laser system that provides instructions for achieving a certain laser output power.

Figure 1:
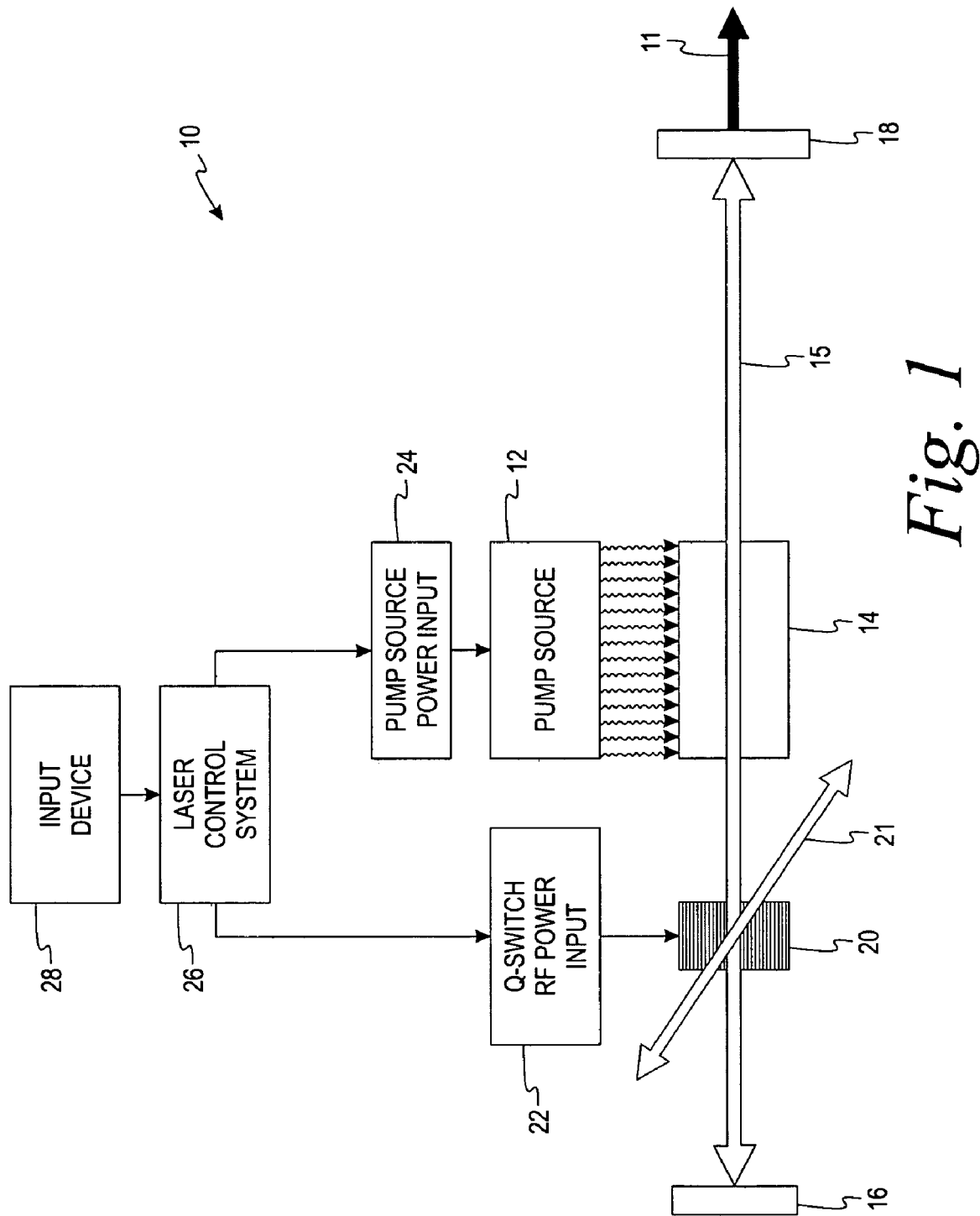
FIG. 1 is schematic of a laser system according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 illustrates a solid-state laser system 10 for producing a high-power laser beam 11. The laser system 10 includes a pump source 12 that pumps a solid state laser medium 14, which can be in the form of a rod or a slab. The pump source 12 is preferably one or more laser diode arrays although other sources, such a flash lamps, can be used. Each laser diode array typically has several semiconductor laser diodes that convert electrical energy into optical energy that is absorbed in the laser medium 14.

The amount of absorption of energy by the laser medium 14 at a given wavelength depends on various factors such as the type of dopants provided in the laser medium 14, the concentration of dopants, and the temperature at which the laser medium 14 is operated. By way of example, if the laser medium 14 is made from Neodymium (3+) doped, Yttrium-Aluminum Garnet (Nd:YAG), the peak absorption occurs at about 808 nm. When the laser diodes at the pump source 12 are made of gallium arsenide with aluminum doping (AlGaAs), they emit radiation at approximately 804 nm to 808 nm, which matches the maximum absorption spectrum for the Nd:YAG material of the laser medium 14. When an Nd:YAG laser medium absorbs energy at 808 nm, it then releases energy at a wavelength of about 1064 nm. These materials for the pump source 12 and the laser medium 14 are used in one preferred embodiment of the solid state laser system 10.

To produce laser resonation, a reflective surface must be positioned outside of each end of the laser medium 14 to cause an output beam 15 to be continuously sent back through the laser medium 14 and achieve "gain." A high-reflective (HR) mirror 16 is typically mounted on a common mounting structure (e.g., optics bench assembly) with the laser medium 14. The surface of the HR mirror 16 typically has a reflectivity value of at least about 99% when the wavelength of the output beam 15 is at 1064 nm. However, the HR mirror 16 preferably transmits energy at other wavelengths such that a separate alignment beam can be transmitted through the HR mirror 16 and into the laser medium 14. For example, the HR mirror 16 preferably transmits energy at about 630 nm, which is typical of common He—Ne lasers.

An output coupling (OC) mirror 18 is located on the opposite side of the laser medium 14 such that the output beam 15 resonates between the HR mirror 16 and the OC mirror 18. The OC mirror 18 has a partially reflective coating on its surface such that a predetermined amount of the output beam 15 is transmitted therethrough and released as the laser beam 11. The remaining energy is reflected back toward the laser medium 14. The reflectivity of the OC mirror 18 determines the overall output in the laser beam 11. Also, the reflectivity must be enough to produce resonation through the laser medium 14. The OC mirror 18 can have a reflectivity that ranges from about 10% (high-gain system) to about 95% (low-gain system) with the optimum value being dependent on the application. In one preferred embodiment, for the laser system 10 operating in a pulsed mode, the reflectivity of the OC mirror 18 is approximately 80%. Also, one of the mirrors 16 or 18 can be a coating placed on the end surface of the laser medium 14.

To provide a pulsed output, a Q-switch 20 is included in the path of the output beam 15 from the laser medium 14. The Q-switch 20 is preferably an acoustic-optic Q-switch device that is switched between an "opened" state and a "closed" state by inducing acoustic waves from a radio-frequency (RF) transducer affixed to a surface of the Q-switch 20. When the Q-switch 20 is in the "closed" state due to application of an RF signal, the output beam 15 does not fully transmit through the Q-switch 20, but instead, a portion of the output beam 15 is diverted off axis to create a loss 21 that is larger than the gain produced by the laser medium 14. In other words, when the RF signal is applied to the Q-switch 20, the Q-switch 20 serves to suppress the lasing action produced by the laser medium 14. When the RF signal is removed and the Q-switch 20 is the "opened" state to allow for optical transmission, the output beam 15 fully resonates between the two mirrors 16 and 18 such that a high-energy, short-duration pulse exits from the laser system 10 as the laser beam 11. While the Q-switch 20 is shown between the laser medium 14 and the HR mirror 16, it should be noted that the Q-switch 20 can be placed on either side of the laser medium 14.

The laser system 10 also includes a Q-switch power input 22 for supplying the RF input signal to the Q-switch 20 and a pump-source power input 24 for supplying input power to the pump source 12. The Q-switch power input 22 and the pump-source power input 24 include the drive electronics for operating the Q-switch 20 and pump source 20, respectively. Typically, the laser system 10 includes a laser control system 26 that controls both the Q-switch power input 22 and the pump-source power input 24. An input device 28 allows the operator of the laser system 10 to enter information for determining the characteristics (e.g., power level, pulse width, frequency, etc.) of the laser beam 11 that exits the system 10. The input device 28 can be directly coupled to the laser control system 26. Alternatively, the input device 28 can communicate with the laser control system 26 from a remote location.

Figure 2A:
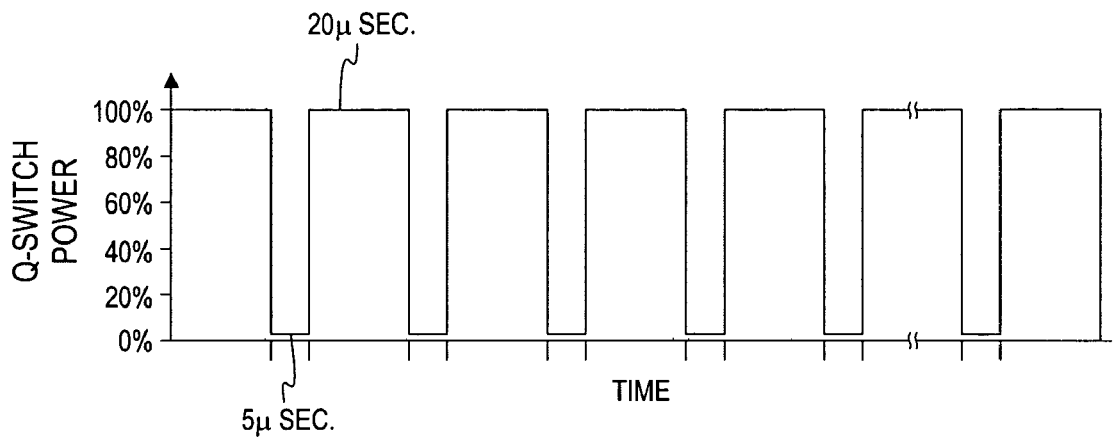
FIGS. 2a-2c illustrate the input signals to the Q-switch for producing different output power levels from the laser system of FIG. 1.
Figure 2B:
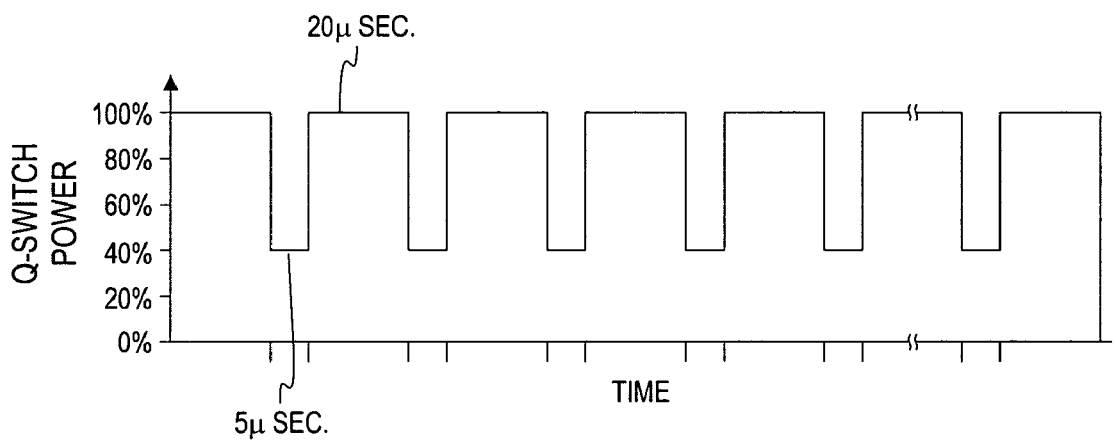
Figure 2C:
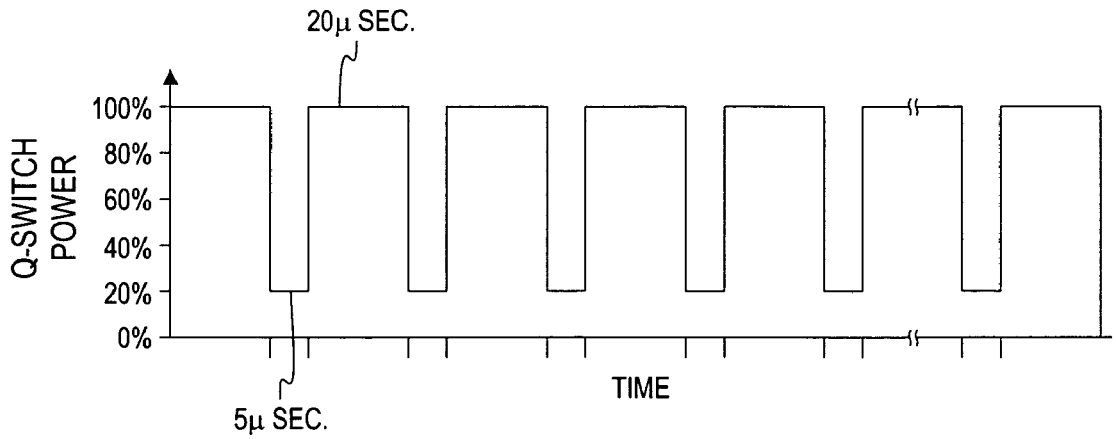

FIGS. 2a-2c illustrates three different signals that can be used for the Q-switch power input 22 of FIG. 1. The three different signals apply power to the Q-switch 20 at the same frequency (50 kHz) such that there is approximately 20 μsec between each pulse of the laser beam 11. It is also assumed that the pump-source power input 24 (FIG. 1) is constant in FIGS. 2a-2c. In the first signal of FIG. 2a, the initial input to the Q-switch 20 is at 100% such that there is a substantial loss 21 (FIG. 1) produced by the Q-switch 20, causing there to be no output of the laser beam 11. However, the Q-switch power is then reduced to a point at which it is zero (or essentially zero), causing the gain produced by the laser medium 14 to increase and resulting in an output pulse of the laser beam 11. The first signal of FIG. 2a for the Q-switch power input 22 continues to drive the Q-switch 20 between the "closed" state and the "opened" state, producing a series of pulses of the laser beam 11 at the maximum output.

In the second signal of FIG. 2b, the initial input signal to the Q-switch 20 is again at 100% such that there is a substantial loss 21 (FIG. 1) produced by the Q-switch 20, causing there to be no output of the laser beam 11. However, after this "closed" state, the Q-switch power is then reduced to a point that is approximately 40% of the maximum output. Accordingly, there is still a loss produced by the Q-switch 20, but the gain produced by the laser medium 14 is greater than the loss produced at the Q-switch 20. This results in a pulsed output in the laser beam 11 in which each pulse has a power level that is less than the maximum power level of the laser beam 11 produced by the input signal of FIG. 2a.

Similarly, in the third signal of FIG. 2c, the initial input signal to the Q-switch 20 is at 100% such that there is a substantial loss 21 (FIG. 1) produced by the Q-switch 20, causing there to be no output of the laser beam 11. After this "closed" state, the Q-switch input power is then reduced to a point that is approximately 20% of the maximum output. Accordingly, like the second input signal of FIG. 2a, there is still a loss produced by the Q-switch 20, but the gain produced by the laser medium 14 is greater than the loss produced at the Q-switch 20. This results in a pulsed output of the laser beam 11 in which each pulse has a power level that is less than the maximum power level of the signal of FIG. 2a, but more than the power level of the signal of FIG. 2b. As such, while FIG. 2a discloses an input signal cycling between an "opened" state and a "closed" state, FIGS. 2b and 2c disclose an input signal cycling between an "partially-opened" state and a "closed" state.

Figure 3:
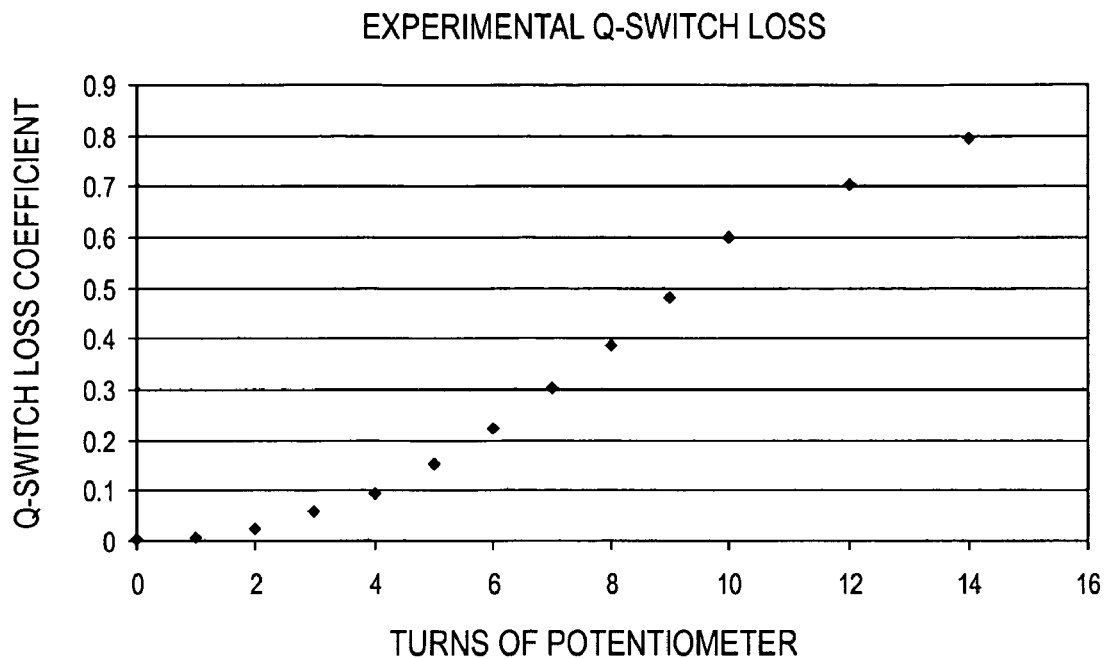
FIG. 3 illustrates the Q-switch loss coefficient as a function of the number of turns on a potentiometer within the Q-switch drive system.
Figure 4:
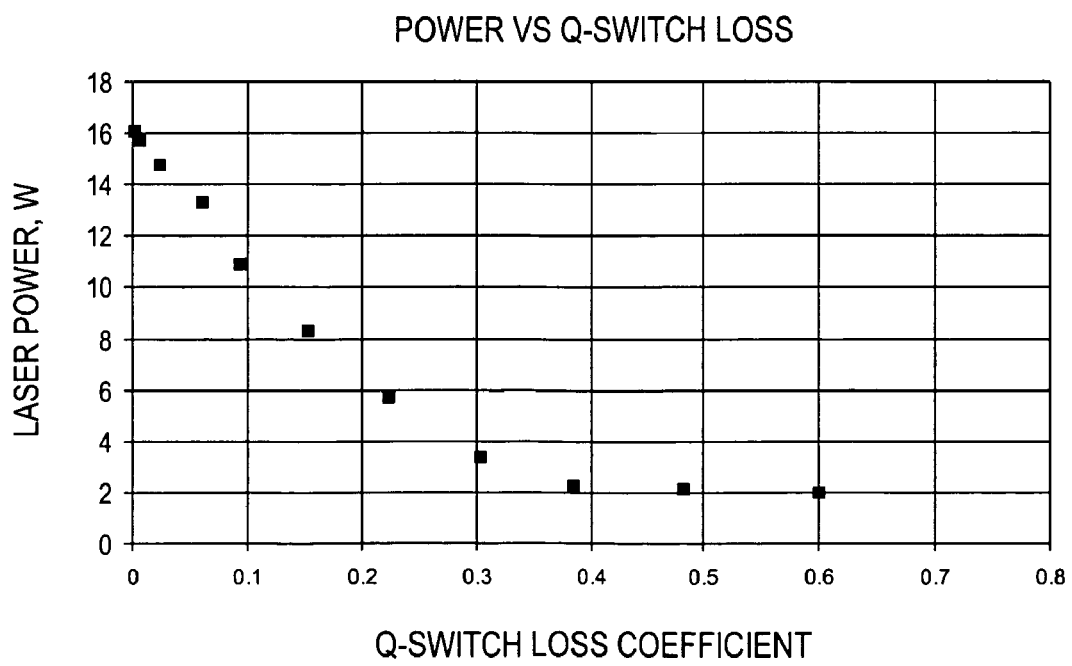
FIG. 4 illustrates the output power for the laser system as a function of the Q-switch loss coefficient as dictated by FIG. 3.

FIGS. 3-5 illustrate results from an experiment in which the amount of power applied to the Q-switch power input 22 is varied, while the pump-source power input 24 is maintained at a substantially constant level. In this experiment, the laser medium 14 was in Nd:YAG rod having dimensions of 2 mm diameter and 63 mm long. The pump source 12 was a plurality of laser diodes that surround the laser medium 14 and provided approximately 180 Watts of input power to the laser medium 14. The mirrors 16 and 18 had a reflectivity of 99.7% and 10%, respectively, at 1064 nm. The Q-switch 20 was made of fused silica. To modulate the Q-switch drive input, a "multi-turn" potentiometer having a variable resistance was placed within the Q-switch power input 22. This potentiometer is part of the electronics that affect the minimum power level applied to the Q-switch 20.

FIG. 3 illustrates the loss coefficient corresponding to the amount of the loss 21 (FIG. 1) created by the Q-switch 20 due to the potentiometer. As can be seen in FIG. 3, as the number of turns of the potentiometer increases, the loss coefficient of the Q-switch 20 increases as well. Further, as shown in FIG. 4, as the loss coefficient of the Q-switch 20 increases, the output power of the laser beam 11 decreases. In summary, during each pulse of output of the laser beam 11, as the number of turns of the multi-turn potentiometer increases, the amount of power in the Q-switch power input 22 also increases, resulting in decreased power output in the laser beam 11.

FIG. 5 illustrates the details of the laser beam 11 for four conditions: 0 turns of the potentiometer, 5 turns of the potentiometer, 6 turns of the potentiometer, and 8 turns of the potentiometer. The pulse width and frequency of the Q-switch power input 22 was set at 5 μsec and 7 kHz, respectively, and the frequency of the signal was 27 MHz. The data of FIG. 5 is indicative of the average characteristics of the laser beam 11 for approximately 100 pulses at each of these four conditions. As indicated in the second column of FIG. 5, the drive current (and, thus, drive power) for the pump source power input 24 (FIG. 1) was decreased in an insubstantial manner (less than 10%) for lower output power settings for the purpose of stabilizing the lens effects of the laser resonator cavity. The amount of decrease in the pump source power input 24 is dependent on the characteristics of the resonator cavity and, in some instances, the decrease in the pump-source power input 24 to stabilize the lens effects may be essentially zero. The pulse width of the laser beam 11 varied from 57 nanoseconds to 64 nanoseconds for all four conditions. The shape of the laser beam 11 remained generally circular for each of the four conditions. The average diameter (average of the beam in the "X" direction and the "Y" direction) of the laser beam 11 changed by only approximately 20% over the entire output range. In summary, the quality of the laser beam 11, the size the laser beam 11, and the divergence of the laser beam 11 remained relatively constant as the output power of the laser beam 11 changed in a controlled manner. Accordingly, the use of the Q-switch 20 to reduce the output power of the laser beam 11 yields consistent beam characteristics.

FIG. 6 illustrates an example of a simple lookup table that can be stored in a memory device associated with the laser system 10. For example, the memory device may be located within the laser control system 26 (FIG. 1). Alternatively, if the laser control system 26 includes separate standard components that are added to the laser system 10, the memory device may be included within, or associated with, the package that houses the laser resonator. In this latter embodiment, the laser control system 26 would access the memory device, which would instruct the laser control system 26 on how to drive the Q-switch 20 and the pump source 12 to achieve a certain output power. In yet a further embodiment, the memory device may be remote from the laser system 10, but is accessible by the laser control system 26 (FIG. 1) through some type of communication link (e.g., Internet, wireless, etc.).

Regardless of the location of the memory device, the lookup table of FIG. 6 provides information regarding the appropriate power for the Q-switch 20 and the source 12 (e.g., laser diodes) that achieves a desired output power of the laser beam 11. As one example, if the laser operator determines that 12 Watts of pulsed output is needed in the laser beam 11, he or she may enter that information via the input device 28 (FIG. 1). The laser control system 26, in response to receiving the inputted information from the operator, then accesses the lookup table of FIG. 6 to determine the appropriate power for the Q-switch 20 and the source 12. The laser control system 26 then controls the Q-switch power input 22 and pump source power input 24 in a manner dictated by FIG. 6. While only five output power levels are shown in the table of FIG. 6, any multitude of power levels can be included.

Although FIG. 6 illustrates an example of a lookup table in which the output power of the laser beam 11 is changed without a substantial change to the drive current to the pump source 12, it should be appreciated that the present invention contemplates a lookup table in which there is no change to the drive current of the pump source 12. As one example, a laser system 10 may be required to only modulate the output power over a very small range. For example, the output power for the laser beam 11 for a laser system 10 may only need to be modulated between 20 Watts and 25 Watts. In such an embodiment, small changes to the Q-switch power input 22 during the trigger could achieve the desired modulation without the need to alter the pump source 12. And, in some laser systems 10, modulation over a large range of the power output for the laser beam 11 can be achieved by altering the Q-switch power input 22.

While FIG. 6 illustrates a lookup table, other forms of storing the information can be utilized as well. For example, equations that relate the output power of the laser beam 11 as a function of the power for the Q-switch 20 and the source 12 can be stored in the memory device. Further, a distinct lookup table and/or equation(s) may be used for certain selected frequencies of the pulsed output of the laser beam 11.

The present invention also contemplates that the laser system 10 is tested prior to shipment from the manufacturer and the optimum values for the Q-switch power input 22 and the pump-source power input 24 are stored in a memory device in some form (e.g., lookup table, power equation(s), etc.) that is accessible by the laser control system 26. Further, as the laser system 10 is operated, the initially stored information may need to be changed over time to provide a desired output power of the laser beam 11 with optimum beam characteristics.

The skilled artisan will recognize that FIG. 1 shows a simplistic diagram for the laser system 10 and that the illustrated embodiment involves a common Nd:YAG laser medium and laser diode pumping system. However, the present invention can be used with more complex laser systems involving different media, pump sources, and additional components (e.g., lens, crystals, frequency-doubling devices, etc.).

In an alternative embodiment, the laser medium 24 produces any output beam 15 that, instead of impinging upon the Q-switch 20, impinges upon a different optical component between the mirrors 16, 18 to introduce a controllable loss in the laser oscillator. One example of such an optical component is an electro-optical Q-switch. This electro-optical device operates in analogy with the acousto-optic devices described herein, but for an optical beam that is linearly polarized. It uses the linear electro-optical effect in certain crystalline materials to produce a change in polarization of the beam in response to a voltage applied to the crystal. The voltage is analogous to the amount of RF power applied by the Q-switch power input 22 to the acousto-optical Q-switch 20 discussed above with respect to FIGS. 1-6.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A laser system, comprising: a source for producing a constant-wave input energy in response to an input drive signal; a laser medium for receiving said input energy and converting said input energy to an output beam; first and second mirrors disposed on opposing sides of said laser medium, said output beam reflecting between said first and second mirrors, said first mirror being an output mirror for releasing a pulsed laser beam having an energy level, said laser medium receiving said constant-wave input energy from said source during and between pulses of said pulses laser beam released from said output mirror; a Q-switch located between said first and second mirrors and in a path of said output beam, said Q-switch being made of material that has an optical property that is alterable in response to a Q-switch input signal; and a control system for controlling said Q-switch input signal and said input-drive signal, said control system decreasing said energy level of a plurality of pulses of said pulsed laser beam at a first frequency by increasing the power of the said Q-switch input signal, said control system increasing said energy level of a plurality of pulses of said pulsed laser beam at said first frequency by decreasing the power of said Q-switch input signal to a power level that is greater than zero.

2. The laser system of claim 1, wherein the source includes a laser diode array.

3. The laser system of claim 1, wherein said control system decreases said energy level of said pulsed laser beam without substantially changing said input drive signal.

4. The laser system of claim 3, wherein said control system decreases said energy level of said pulsed laser beam without changing said input drive signal.

5. The laser system of claim 1, further including a memory device storing information related to said energy level as a function of said Q-switch input drive signal.

6. The laser system of claim 5, wherein said information is in a look-up table.

7. The laser system of claim 1, further including a memory device storing information related to said energy level as a function of said Q-switch input drive signal and said input drive signal to said pump source.

8. The laser system of claim 1, further including an input device coupled to said control system, said input device for receiving energy-level input commands from an operator to control said energy level.

9. A method of controlling a power level of a pulsed laser beam from a laser system including a source that is capable of producing a constant-wave input energy and a laser medium that receives said input energy, said laser medium converting said input energy to an output beam that reflects between first and second reflective surfaces, said method comprising:

in response to a first control signal at a first frequency received by an optical component made of a material having an alterable optical property and located between said first and second reflective surfaces, producing said pulsed laser beam for a plurality of pulses at a maximum power level, said plurality of pulses at said maximum power level occurring while said laser medium is receiving said constant-wave input energy from said source; and in response to a second control signal at said first frequency received by said optical component, producing said pulsed laser beam for a plurality of pulses at an intermediate power level that is less than said maximum power level and greater than zero, said plurality of pulses at said intermediate level occurring while said laser medium is receiving said constant-wave input energy from said source, said first control signal being different from said second control signal.

10. The method of claim 9, wherein said input energy from said source is substantially constant when said pulsed laser beam is at said maximum power level and said intermediate power level.

11. The method of claim 9, wherein said optical component is a Q-switch.

12. The method of claim 11, wherein said laser system further includes a control system for sending said first and second control signals, said second control signal having a higher power during each pulse than said first control signal.

13. The method of claim 12, wherein said intermediate power level is produced without substantially altering said input energy from said source.

14. The method of claim 13, wherein said control system further controls said input energy from said source.

15. The method of claim 9, wherein said source includes a laser diode array.

16. The method of claim 9, wherein said laser system further includes components for polarizing said output beam,
said optical component is an electro-optic polarization device that is controllable via said first and second control signals.

17. The method of claim 9, further including, in response to a third control signal at a first frequency received by said optical component, producing said pulsed laser beam for a plurality of pulses at a power level that is less than said intermediate power level and greater than zero.

18. A laser system, comprising:
a source for producing input energy;
a laser medium for receiving said input energy and converting said input energy to an output beam;
first and second reflective surfaces for reflecting said output beam therebetween, said first reflective surface releasing a pulsed laser beam having an energy level;
a Q-switch located between said first and second reflective surfaces and in a path of said output beam, said Q-switch being made of material that has an optical property that is alterable in response to a Q-switch input signal; and
a control system for selectively varying said Q-switch input signal power and a 0-switch input signal frequency to control said pulsed laser beam, said 0-switch input signal power including at least two different power levels above a zero-power level, a first power level of said Q-switch input signal producing said pulsed laser beam for a plurality of pulses at a maximum power level while said laser medium is receiving a constant-wave input energy from said source, a second power level of said Q-switch input signal producing said pulsed laser beam for a plurality of pulses at an intermediate power level that is less than said maximum power level and greater than zero while said laser medium is receiving a constant-wave input energy from said source.

19. The laser system of claim 18, wherein said input energy from said source is substantially constant when said pulsed laser beam is at said maximum power level and said intermediate power level.

20. The laser system of claim 18, wherein said reflective surfaces are located on mirrors positioned away from said laser medium.

* * * * *